United States Patent [19]

Nakata et al.

[11] Patent Number: 5,204,391

[45] Date of Patent: Apr. 20, 1993

[54] BLOCKED POLYISOCYANURATE AND POLYVINYL CHLORIDE PLASTISOL COMPOSITION CONTAINING THE SAME

[75] Inventors: Yoshihiro Nakata, Takatsuki; Hirohide Tomoyasu, Ohtsu, both of Japan

[73] Assignee: Sunstar Engineering, Inc., Osaka, Japan

[21] Appl. No.: 917,739

[22] Filed: Jul. 23, 1992

Related U.S. Application Data

[63] Continuation of Ser. No. 602.685. Oct. 24, 1990, abandoned.

[30] Foreign Application Priority Data

Oct. 26, 1989 [JP] Japan .................................. 1-279328

[51] Int. Cl.⁵ .............................................. C08J 5/34
[52] U.S. Cl. .................................... 524/100; 524/114; 524/311; 524/296; 524/297; 524/140; 524/143; 524/425
[58] Field of Search ............... 524/100, 114, 140, 143, 524/296, 297, 425

[56] References Cited

U.S. PATENT DOCUMENTS 4,696,991 8/1987 Kobayashi et al. .................... 528/45
4,983,655 1/1991 Nakata et al. .

FOREIGN PATENT DOCUMENTS 62-41278 2/1987 Japan .

Primary Examiner—Joseph L. Schofer
Assistant Examiner—Peter D. Mulcahy
Attorney, Agent, or Firm—Birch, Stewart, Kolasch & Birch

[57] ABSTRACT

Provided are novel blocked polyisocyanurates to be suitably used as an adhesiveness providing agent, coating material, sealant and crosslinking agent for polymers containing active hydrogens. Also provided are polyvinyl chloride plastisol compositions comprising a polyvinyl chloride resin, the above blocked polyisocyanurate as an adhesiveness providing agent, plasticizer and a specific agent for accelerating dissociation of the blocked polyisocyanurate. These compositions have excellent properties such as high adhesiveness even cured at low temperatures and resistance to yellowing, and are suitably used particularly as sealants for car body.

6 Claims, No Drawings

BLOCKED POLYISOCYANURATE AND POLYVINYL CHLORIDE PLASTISOL COMPOSITION CONTAINING THE SAME

This application is a continuation of application Ser. No. 07/602,685 filed on Oct. 24, 1990, now abandoned, the entire contents of which are incorporated herein by reference.

BACKGROUND OF THE INVENTION

1. Field of the Invention

The present invention relates to a blocked polyisocyanurate and polyvinyl chloride plastisol compositions (hereinafter referred to as "PVC plastisol compositions"), containing the same as an adhesiveness providing agent. More specifically, the present invention relates to a blocked polyisocyanurate having resistance to discoloration and suitable for use as an adhesiveness providing agent, coating material, sealant, crosslinking agent for polymers containing active hydrogens and the like, and also relates to polyvinyl chloride plastisol compositions having high adhesiveness even when cured at low temperatures and resistance to yellowing, which contain the above polyisocyanurate as an adhesiveness providing agent and which are particularly suitable as sealants for car bodies.

2. Descriptions of the Prior Art

In recent years, PVC plastisol compositions have been used in a wide variety of fields, such as adhesives, sealants, covering materials and the like.

There are known PVC plastisol compositions, for example, one comprising polyvinyl chloride resin, a plasticizer and, as an adhesiveness providing agent, a long-chain alkylphenol-blocked polyisocyanate (see Japanese Patent Application Laid-open No. 41278/1987). According to the application, this plastisol composition has high storage stability under conditions of high temperature and high humidity, is free from foaming or discoloration and can form at high temperature a gel having high adhesiveness.

The above conventional PVC plastisol composition has, however, been found to be of poor adherence when cured at a low temperature in the range of 110° to 130° C. on electrodeposited base materials.

As a result of an intensive study to overcome this problem, the present inventors have found that PVC plastisol compositions, that can be hydrolyzed by moisture present in the system or in the air even at such a low temperature as the above range to be cured while exhibiting good adhesion to base materials and do not yellow after the curing, are obtained by using an adhesiveness providing agent comprising a specific polyisocyanate being blocked with styrenized phenol and being capable of dissociating by de-blocking even when cured at this low temperature, together with a specific dissociation accelerating agent. The present invention has been completed based on this finding.

SUMMARY OF THE INVENTION

Accordingly, an object of the present invention is to provide a plastisol composition having resistance to yellowing and, in particular, excellent adherence even when cured at a low temperature.

Another object of the present invention is to provide a novel blocked polyisocyanurate that is required for the production of the above plastisol composition and that is also suitable for other uses.

Thus, the present invention provides a blocked polyisocyanurate represented by the following general formula (1)

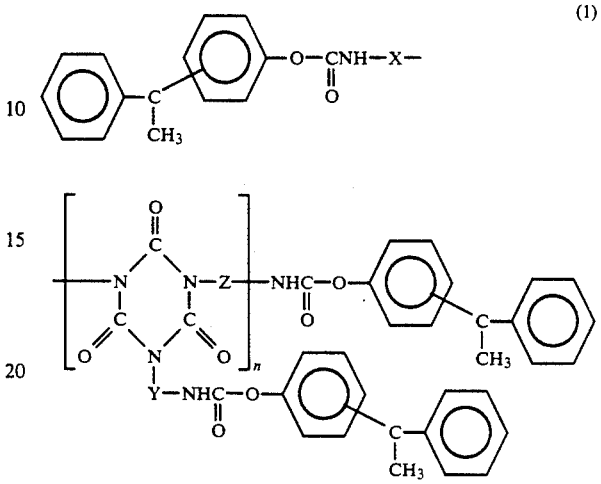

wherein X, Y and Z each independently represents a residue derived by elimination of the isocyanate groups of an aliphatic diisocyanate, an alicyclic diisocyanate, an aromatic diisocyanate with its isocyanate groups not directly bonded to the aromatic ring or a hydrated aromatic diisocyanate; and n represents an integer of 1 to 10.

The present invention also provides a PVC plastisol composition comprising a polyvinyl chloride resin, a plasticizer, the blocked polyisocyanurate described above as an adhesiveness providing agent and at least one catalyst that accelerates dissociation of the adhesiveness providing agent and is selected from the group consisting of dibutyltin diacetate, zinc octoate, stannous octoate, dibutyltin dimaleate and triethylenediamine.

DETAILED DESCRIPTION OF THE PREFERRED EMBODIMENTS

The first embodiment of the present invention, that is, the blocked polyisocyanurate represented by the above general formula (1) {hereinafter referred to as "blocked polyisocyanurate (1)"} can be prepared by, for example, the following process 1 or 2.

Process 1

At first, 1 to 3 types of diisocyanates represented by the general formula (2) shown below are isocyanurated in an appropriate solvent at 20° to 80° C. in the presence of a catalyst to form a polyisocyanurate, which is a polyisocyanate, represented by the general formula (3) also shown below.

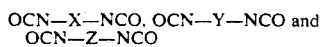
(2)

wherein X, Y and Z are the same as defined before for the general formula (1)

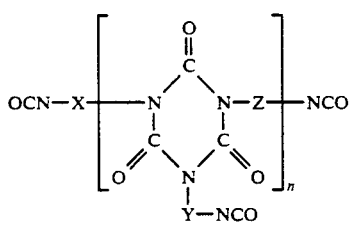

(3)

wherein X, Y and Z are the same as above and n represents an integer of 1 to 10.

Examples of the diisocyanates represented by the above formula (2) are aliphatic diisocyanates such as hexamethylene diisocyanate (HDI), trimethylhexane diisocyanate (TMDI) and lysine diisocyanate (LDI); alicyclic diisocyanates such as isophorone diisocyanate; aromatic diisocyanates with the isocyanate groups not directly bonded to the aromatic ring, such as xylylene diisocyanate and tetramethylxylylene diisocyanate; and hydrated aromatic diisocyanates such as hydrated diphenylmethane-4,4'-diisocyanate ($H_{12}MDI$).

Examples of suitable solvents used in the above isocyanuration reaction are acetic acid esters such as ethyl acetate and butyl acetate; ketones such as methyl ethyl ketone and methyl isobutyl ketone; phthalic acid esters such as dibutyl phthalate and dioctyl phthalate; ethers such as dioxane and tetrahydrofuran; aromatic compounds such as toluene and xylene; dimethylformamide and N-methylpyrrolidone.

Examples of the catalyst used in the isocyanuration reaction are alkali metal salts of organic carboxylic acids, such as potassium acetate, sodium acetate and sodium stearate; tertiary amine compounds; quaternary ammonium compounds; epoxyamine compounds and phenolamine compounds.

The polyisocyanurate represented by the above formula (3) is then reacted with an excess of a styrenized phenol represented by the formula (4) shown below, which blocks its NCO groups, at 60° to 100° C. in the presence of a reaction-accelerating catalyst to give the blocked polyisocyanurate (1).

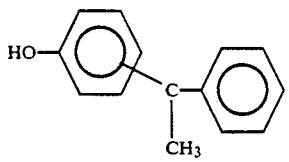

(4)

The reaction-accelerating catalyst used in this reaction is suitably selected from among organic tin compounds such as dibutyltin dilaurate, dioctyltin dilaurate and stannous octoate; metal salts of naphthenic acid such as zinc naphthenate and cobalt naphthenate; acetylacetone-Fe; acetylacetone-Mn; tertiary amine compounds; and like catalysts.

Process 2

At first a diisocyanate represented by the above formula (2) and a styrenized phenol represented by the formula (4) are reacted with each other in such a weight ratio as gives a NCO/OH molar ratio of 1.5 to 4 to give a blocked diisocyante. Then, the obtained diisocyanate is isocyanurated in the same manner as in Process 1 to give the blocked polyisocyanurate of the present invention. The solvent used for the isocyanuration reaction and the catalysts used for the blocking reaction and the isocyanuration reaction are the same as those used in Process 1.

The blocked polyisocyanurate (1) thus prepared can be suitably used as an adhesiveness providing agent, coating material, sealant, crosslinking agent for polymers containing active hydrogens and the like.

Another embodiment of the present invention is a PVC plastisol composition containing the above blocked polyisocyanurate (1) that acts as an agent for providing the composition with adhesiveness, a specific catalyst for accelerating dissociation of the polyisocyanurate (1), a polyvinyl chloride resin and a plasticizer.

The amount of the blocked polyisocyanurate (1) incorporated in the composition is not specifically limited, but it is preferably 3 to 30 parts by weight based on 100 parts by weight of the polyvinyl chloride resin used, and more preferably 5 to 20 parts on the same basis. If the amount incorporated is less than 3 parts by weight (hereinafter referred to simply as "parts"), the obtained composition will exhibit an insufficient adherence property. On the other hand, with the amount incorporated exceeding 30 parts, there often occurs problems of a generation of pinholes in the cured product due to foaming and other physical property problems.

The blocked polyisocyanurate (1) can dissociates and harden by curing at high temperatures without requiring the presence of a catalyst, but it hardly dissociates at a low temperature of about 130° C. or below. Here lies the reason why the composition of the present invention contains a specific dissociation accelerating agent as an essential component.

As the dissociation accelerating agent there can be used stannous octoate, dibutyltin maleate, triethylenediamine, dibutyltin diacetate and zinc octoate, among those which are particularly preferred, are dibutyltin diacetate and zinc octoate. These catalysts may be used singly or in combination, as necessary.

Any conventional polyvinyl chloride resin used for plastisols can be used for the composition of the present invention, and there can be used those obtained by polymerizing vinyl chloride monomer alone or with other monomers copolymerizable therewith, by a known polymerization process such as emulsion polymerization, suspension polymerization, bulk polymerization or solution polymerization.

Examples of the monomer copolymerizable with the vinyl chloride monomer are vinyl esters such as vinyl acetate, vinyl propionate and vinyl laurate; acrylates such as methyl acrylate, ethyl acrylate and butyl acrylate; methacrylates such as methyl methacrylate and ethyl methacrylate; maleates such as dibutyl maleate and diethyl maleate; fumarates such as dibutyl fumarate and diethyl fumarate; vinyl ethers such as vinyl methyl ether, vinyl butyl ether and vinyl octyl ether; vinyl cyanides such as acrylonitrile and methacrylonitrile; α-olefins such as ethylene, propylene and styrene; vinyl halides, excluding vinyl chloride, such as vinyl bromide and vinylidenes such as vinylidene chloride.

Any known plasticizer used for conventional polyvinyl chloride resins can be used for the composition of the present invention, and its examples include phthalic acid esters such as di(n-butyl) phthalate, octyldecyl phthalate, diisodecyl phthalate, di(2-ethylhexyl) isophthalate, di(2-ethylhexyl) phthalate, butylbenzyl phthalate, dioctyl phthalate, dinonyl phthalate, diisononyl phthalate (DINP), diheptyl phthalate and butylphthalyl butyl glycolate; aliphatic dibasic acid esters such as dioctyl adipate, didecyl adipate, dioctyl sebacate, di(2-ethylhexyl) adipate, diisodecyl adipate, di(2-ethylhexyl) azelate, dibutyl sebacate and di(2-ethylhexyl) sebacate; phosphoric acid esters such as tricresyl phosphate, trioctyl phosphate, tri(2-ethylhexyl) phosphate and 2-ethylhexyldiphenyl phosphate; epoxy plasticizers such as epoxidized bean oil and 2-ethylhexyl ester of epoxidized tall oil aliphatic acid; and polyester-bases plasticizers. These plasticizers may be used singly or, as required, in combination.

The amount of the plasticizer incorporated influences the flow characteristics and physical properties after curing of the plastisol compositions, and is generally 65 to 130 parts based on 100 parts of the polyvinyl chloride resin used.

The plastisol composition of the present invention is, as described heretofore, composed of a polyvinyl chloride resin, a plasticizer, an adhesiveness providing agent represented by the formula (1) and a dissociation accelerating catalyst therefor, but it may, as required, further incorporate additives including a filler such as untreated precipitated calcium carbonate, precipitated calcium carbonate surface-treated with an aliphatic acid or a resin acid, limestone powder, calcium oxide, clay, talc, silica and glass powder, an agent for suppressing and stabilizing a dehydrochlorination reaction, a heat stabilizer and a pigment such as titanium white.

Other features of the present invention will become apparent in the course of the following descriptions of exemplary embodiments which are given for illustration of the present invention and are not intended to be limiting thereof. In the Examples and Comparative Examples that follow, "%" means "% by weight".

EXAMPLES

I. Synthesis of Blocked Polyisocyanurate

Example 1

To a solution comprising 100 g of hexamethylene diisocyanate and 315 g of di(2-ethylhexyl) phthalate was added 110 g of styrenized phenol and 0.5 g of dibutyltin diacetate as a dissociation accelerating catalyst, and the resultant mixture was subjected to reaction at 80° C. for 6 hours to give a partially blocked diisocyanate (content of free NCO group: 5.1%).

To the reaction mixture was added 2 g of 5% solution of potassium acetate, as an isocyanuration reaction catalyst, in methanol, and the obtained mixture was reacted at 80° C. until no absorption of NCO group (2250 cm$^{-1}$) by IR became visible, to give a blocked polyisocyanurate. The blocked polyisocyanurate thus obtained had a regenerated NCO group content of 4.4%. The compound was confirmed by IR for the presence of the absorption of a isocyanurate ring (1410 cm$^{-1}$).

Example 2

Example 1 was repeated except for using 0.5 g of zinc octoate as a dissociation accelerating catalyst, to obtain a partially blocked diisocyanate (content of free NCO group: 5.0%), and further a blocked polyisocyanurate. The blocked polyisocyanurate obtained had a regenerated NCO group content of 4.4% and was confirmed by IR for the presence of the absorption of a isocyanurate ring.

Example 3

Example 1 was repeated except for using 0.5 g of dibutyl tin diacetate and 0.5 g of dibutyltin dilaurate as dissociation accelerating catalysts, to obtain a partially blocked diisocyanate (content of free NCO group: 5.0%), and further a blocked polyisocyanurate. The blocked polyisocyanurate obtained had a regenerated NCO group content of 4.4% and was confirmed by IR for the presence of the absorption of a isocyanurate ring.

Example 4

Example 1 was repeated except for using 0.5 g of zinc octoate and 0.5 g of dibutyltin dilaurate as dissociation accelerating catalysts, to obtain a partially blocked diisocyanate (content of free NCO group: 5.0%), and further a blocked polyisocyanurate. The blocked polyisocyanurate obtained had a regenerated NCO group content of 4.4% and was confirmed by IR for the presence of the absorption of disocyanurate ring.

Comparative Example 1

Example 1 was repeated except for using 0.5 g of lead octoate as a dissociation accelerating catalyst, to obtain a partially blocked diisocyanate (content of free NCO group: 5.0%), and further a blocked polyisocyanurate. The blocked polyisocyanurate obtained had a regenerated NCO group content of 4.4% and was confirmed by IR for the presence of the absorption of disocyanurate ring.

Comparative Example 2

Example 1 was repeated except for using 0.5 g of dibutyltin dilaurate as a dissociation accelerating catalyst, to obtain a partially blocked diisocyanate (content of free NCO group: 5.0%), and further a blocked polyisocyanurate. The blocked polyisocyanurate obtained had a regenerated NCO group content of 4.4% and was confirmed by IR for the presence of the absorption of disocyanurate ring.

Comparative Example 3

To a solution comprising 150 g of TDI-80 (2,4-tolylene diisocyanate: 80%, 2,6-tolylene diisocyanate: 20%) and 1,000 g of di (2-ethylhexyl) phthalate were added 100 g of styrenized phenol and 0.5 g of dibutyltin dilaurate, and the mixture was subjected to reaction at 80° C. for 6 hours to give a partially blocked diisocyanate (content of free NCO group: 5.1%). Then, a blocked polyisocyanurate was obtained from this diisocyanate in the same manner as in Example 1. The blocked polyisocyanurate obtained had a regenerated NCO group content of 8.4% and was confirmed by IR for the presence of the absorption of disocyanurate ring.

II. Preparation of Various PVC Plastisol Compositions

Examples 5 through 8 and Comparative Examples 4 through 6

Groups of components for the compositions shown in Table 1 were each mixed with stirring at a room temperature for 1 hour in a kneader, and the mixtures were then degassed under reduced pressure to give the compositions.

The components and the amounts (parts by weight) incorporated are also shown in Table 1.

III. Property Evaluation of the PVA Plastisol Compositions

The compositions obtained in the item II above were evaluated for adherence when cured at low temperature, resistance to yellowing and storage stability according to the following test methods.

Low Temperature Adherence

A specimen composition is applied to form a semicircular shape having a diameter of 10 mm on a steel plate that has been cation-type electrodeposition coated. The plate is heated at 120° C. for 30 minutes to cure and harden the specimen and then allowed to cool to room temperature. The cured specimen is peeled with nail. Whether the peeling resulted in cohesive failure or adhesive failure is visually checked to evaluate the low temperature adherence as ◯: cohesive failure=high adherence; and X: adhesive failure=low adherence.

Resistance to Yellowing

A specimen composition is applied to form a semicircular shape having a diameter of 10 mm on a steel plate that has been cation-type electrodeposition coated. The plate is heated at 160° C. for 60 minutes to cure and harden the specimen and then allowed to cool to room temperature. The specimen is visually checked for yellowing and evaluated as ◯: not yellowed and X: yellowed.

Storage Stability

The viscosity of a specimen composition at 20° C. and that of the specimen after being stored at 40° C. for 7 days are measured. The storage stability of the specimen is evaluated by the degree of the increase in the viscosity.

The results of the evaluations are shown in Table 1.

TABLE 1

|  | Example | | | | Comparative Example | | |
| --- | --- | --- | --- | --- | --- | --- | --- |
|  | 5 | 6 | 7 | 8 | 4 | 5 | 6 |
| DOP | 100 | 100 | 100 | 100 | 75 | 75 | 75 |
| Adhesiveness providing agent | A 25 | B 25 | C 25 | D 25 | E 25 | F 25 | G 50 |
| PVC resin ① | 50 | 50 | 50 | 50 | 50 | 50 | 50 |
| PVC resin ② | 20 | 20 | 20 | 20 | 20 | 20 | 20 |
| Surface-treated calcium carbonate | 50 | 50 | 50 | 50 | 50 | 50 | 50 |
| Limestone powder | 120 | 120 | 120 | 120 | 120 | 120 | 120 |
| Calcium oxide | 5 | 5 | 5 | 5 | 5 | 5 | 5 |
| Low temperature adherence | ◯ | ◯ | ◯ | ◯ | X | X | ◯ |
| Initial viscosity (cps) | 6.5 | 6.4 | 6.5 | 6.6 | 6.3 | 6.1 | 7.2 |
| Viscosity after 7 days' standing (cps) | 7.5 | 7.3 | 7.6 | 7.4 | 7.0 | 7.1 | 8.5 |
| Resistance to yellowing | ◯ | ◯ | ◯ | ◯ | ◯ | ◯ | X |

In Table 1, the components used are as follows.

Adhesiveness Providing Agents A through D

Correspond to the blocked polyisocyanurates synthesized in Examples 1 through 4, respectively (solid content: 40%).

Adhesiveness Providing Agents E and F

Correspond to the blocked polyisocyanurates synthesized in Comparative Examples 1 and 2 respectively (solid content: 40%).

Adhesiveness Providing Agents G

Corresponds to the blocked polyisocyanurate synthesized in Comparative Example 3 (solid content: 20%).

PVC Resin ①

"PSH-10"; made by Kanegafuchi Chemical Industry Co.

PVC Resin ②

"PBM-10"; made by Kanegafuchi Chemical Industry Co.

Surface-Treated Calcium Carbonate

"HAKUENKA CCR"; made by Shiraishi Calcium Co.

Limestone Powder

"WHITON B"; made by Shiraishi Calcium Co.

Calcium Oxide

"QCX"; made by Inoue Sekkai Co.

It is seen from the table that all of the PVC plastisol compositions obtained in Examples 5 through 8 were excellent in low temperature adherence and showed no yellowing, while those obtained in Comparative Examples 4 and 5, which used different dissociation accelerating catalysts, were both inferior, showing adhesive failure, in low temperature adherence.

It is also seen from the table that the PVC plastisol composition obtained in Comparative Example 3, utilizing as adhesiveness providing agent the blocked polyisocyanurate obtained by isocyanurating and blocking a diisocyanate with its isocyanate groups directly bonded to the aromatic ring, was inferior in resistance to yellowing, being excellent in low temperature adherence though.

With respect to storage stability, all of the compositions tested showed stability sufficient for practical purposes with no significant difference among each other.

Obviously, numerous modifications and variations of the present invention are possible in light of the above teachings. It is therefore to be understood that within the scope of the appended claims, the present invention may be practiced otherwise than as specifically described herein.

What is claimed is:

1. A polyvinyl chloride plastisol composition comprising a polyvinyl chloride resin, a plasticizer, a blocked polyisocyanurate as an adhesiveness providing agent represented by the following general formula (1)

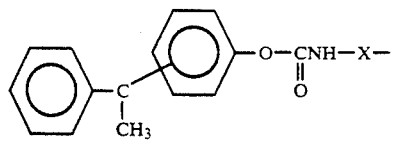 (1)

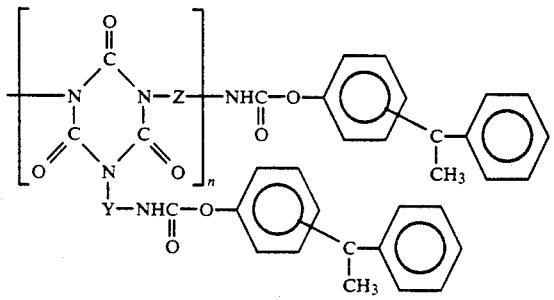

wherein X, Y and Z each independently represents a residue derived by elimination of the isocyanate groups of an aliphatic diisocyanate or an alicyclic diisocyanate, and n represents an integer of 1 to 10, and at least one catalyst that accelerates dissociation of the adhesiveness providing agent and is selected from the group consisting of dibutyltin diacetate, zinc octoate, stannous octoate, dibutyltin dimaleate and triethylenediamine.

2. The polyvinyl chloride plastisol composition according to claim 1, wherein X, Y and Z each independently represents a hexamethylene group.

3. The polyvinyl chloride plastisol composition according to claim 1, wherein the plasticizer is selected from the group consisting of a phthalic ester, an aliphatic dibasic acid ester, a phosphoric acid ester, an epoxy plasticizer and a polyester-based plasticizer.

4. The polyvinyl chloride plastisol composition according to claim 1, which further comprises a filler selected from the group consisting of an untreated precipitated calcium carbonate, a precipitated calcium carbonate surface-treated with an aliphatic acid or a resin acid, limestone powder, calcium oxide, clay, talc, silic and glass powder, an agent for suppressing and stabilizing a dehydrochlorination reaction, a heat stabilizer, a pigment or a mixture thereof.

5. The polyvinyl chloride plastisol composition according to claim 1, wherein the amount of the plasticizer present is about 65 to 130 parts based on 100 parts of the polyvinyl chloride resin.

6. The polyvinyl chloride plastisol composition according to claim 1, wherein the polyvinyl chloride resin is obtained by polymerizing vinyl chloride alone or with a comonomer selected from the group consisting of a vinyl ester, an acrylate, a methacrylate, a maleate, a fumarate, a vinyl ether, a vinyl cyanide, an α-olefin, a vinyl halide other than vinyl chloride and a vinylidene halide.

* * * * *